Patented May 31, 1927.

1,630,985

UNITED STATES PATENT OFFICE.

HENRI LOUIS PAUL TIVAL, OF LE PECQ, FRANCE. REISSUED

MEANS FOR PREPARING PRODUCTS OF ORGANIC ORIGIN.

No Drawing. Application filed April 24, 1922, Serial No. 556,305, and in Belgium April 26, 1921.

The invention relates to means for preparing products such as powders, juices, extracts and active principles of organic origin.

The products derived from organic substances differ in their mode of action according whether they are in a fresh or dried state. This difference, especially in the case of medicinal or alimentary products, arises from the fact that the active or nutritive principles are associated, in the living organism, with other chemical compounds with which they form complex combinations, the molecular constitution of which differs from that of the components. Now it is known that the physiological action of a medicament is a function of its molecular structure, and that any disarrangement of the molecules will involve changes and modifications in the therapeutical effect of such substance. These complex combinations partially or entirely disappear in the dried organisms, under the influence of ferments and in the course of the various manipulative treatments to which the substances are subjected, such as pulping, desiccation, decoction, filtration, etc., and under the action of various physical and chemical agencies, such as heat, solvents and antiseptics.

For this reason attempts have been made, in the case of plants, to destroy the ferments contained therein in order to free them from the adverse influence of catalytic action, either by immersing the plants in boiling alcohol or by treating them while in the fresh state in an autoclave in presence of alcohol vapour or steam.

These processes, known as "sterilization" or "stabilization", are defective. In fact the influence of temperature on ferments is of a complex character and its destructive action varies considerably according to the nature of the ferments, the conditions of the medium and the time factor. It cannot be said that any absolute fatal temperature exists. Heat is attended with the drawback that it acts both on the ferments and on these other portions of the organism which are intended to be protected. Moreover, the sterilizing action is not uniform from the periphery to the centre of such organism. Consequently the desired object is not attained and the desiccation of organic substances is always a very delicate operation.

On the other hand, the raw materials employed, whether for foodstuffs or in pharmacy, are subjected to a series of operations for the purpose of bringing them into a suitable form to facilitate their preservation or consumption. These materials vary to such an extent in volume, consistency and texture that their treatment entails the use of numerous and varied appliances, experienced handling, and treatments which are often protracted. Moreover, in certain cases their treatment necessitates aseptic precautions which it is practically impossible to carry out owing to the risk of bacterial contamination, which increases in proportion to the number of operations to be performed.

Furthermore by reason of the sensitiveness and fragility of the complex organic combinations, the importance of the changes the natural substances may undergo, and the ease with which they are contaminated by bacterial agents, it has been found necessary to adopt a simple and rational form of treatment in which the number of operations is reduced to a minimum.

The method selected is that of reducing the substance to powder, which has the advantage of enabling one to present the product in small quantities and in an extremely fine state of subdivision. In this way the manipulation of the product is facilitated, the desiccation is accelerated, the extraction of the principles is improved, and the assimilation and activity are increased. Since the pulverulent form serves as the basis of all the applications of the product i. e. for infusions, digestions, tinctures, alcoholates, extracts, etc., it follows that the therapeutical or alimentary value of a preparation will depend on that of the powder from which it has been prepared. The pulverulent form also produces the most decided nutritive and curative results, experience having shewn that it is in the interest of the internal economy that the active principles in which the organism is deficient should be restored thereto in the complex form in which they exist in nature, and that the pulverulent form is the only one in which the associated active principles may be conserved.

The main object of the invention is to carry out the said methods of preparation in such a way as to overcome the various specified drawbacks to obtain a final product which represents, as closely as possible, the original substance as it was in the living state, and, in the case of an extract or an active principle, to obtain a body in a condition as near its natural state as possible.

An important feature of the invention is that the organic substances to be treated may, instead of being first sterilized, then dried and finally pulverized, as is the usual practice, be on the contrary first pulverized, then sterilized and finally dried. This result is attained by subjecting the said substances to a temperature appreciably below their congelation point with an intensity and rapidity sufficient to bring them, so to speak, instantaneously into a condition of hardness and rigidity favourable to pulverization, without the possibility of the intervention of chemical and fermentative reactions. The next step is to subject these powdered substances, while still under the influence of low temperature to rays which destroy microbes and ferments, after which the powder may be either dried and used in that form or may without being dried, serve for the extraction—by means of solvents—of the active principles they contain, the said active principles being then recovered by decanting and evaporating the liquid.

In addition to this principal feature, the invention contemplates certain other steps, which are preferably employed concurrently and will be more fully described hereinafter, more particularly that in which the destruction of the microbes and ferments is effected by subjecting the said pulverized substances, while still under the influence of low temperature, to the action of an oscillating electrical field of suitable frequency either in place of, or simultaneously with, the said destructive rays.

The invention will be understood from the following description which, of course, is only given by way of example.

Let it be assumed, for example, that it is desired to obtain from an organic substance a powder which will represent as closely as possible the original substance as it was in the live state. In such case the method of procedure will be substantially as follows.

In the first place the organic substance to be treated is subjected to a suitable very low temperature differing appreciably from the ordinary degree of temperature employed for certain purposes such as for the preservation of plants, treatment of fatty substances, concentration of saline solutions, calf liver, hawthorn flowers, etc. With this object, for example, in view the said substance is immersed in a liquefied gas or exposed to an atomized spray of said liquid gas. The substance at once becomes hard and friable, so that it can be reduced to powder by any suitable mechanical means. The living organism is rendered inert, stabilized in its original condition, and any ferments and microbes it may contain pass into a condition of suspended vitality.

In the next stage means are employed which are adapted to kill, in the resulting powder, the ferments and microbes whose activity has merely been suspended by the action of low temperature. Said means consists in utilizing the bactericidal properties of certain rays, for example those of the spectrum, of relatively short wave-length which belong to the most refractable area of the said spectrum and are recognized—at least in the present state of knowledge—as being the most powerful bactericides. After being freed, by suitable filtration, from such rays as might have an adverse effect on the operation, these bactericidal rays are allowed to act on the said powder—or during its preparation—while the same is still exposed to the action of low temperature. The destruction of the microbes and ferments can also be effected by causing an oscillating electrical field of suitable frequency to act either in place of or concurrently with these destructive rays on the pulverized substances while still under the influence of low temperature.

Finally, the said powder after being thus freed from the injurious action of the micro-organisms, can be dried without difficulty, and is effectually dried by suitable means, for example in autoclaves in which a high vacuum and a temperature below zero can be produced. Thereafter the active principles can be extracted therefrom if desired.

The extraction of the active principles contained in the powder can be effected with the undried powder. In this case, use is made of the solvent properties of certain liquefied gases, such as certain neutral hydrocarbons, for example methane. The liquid is brought into contact with the powder in a closed vessel under pressure, and in this way macerations or lixiviations are obtained. After being left to settle, the dissolved portion floating in a sealed or liquid state on the residue containing water is collected by decantation into suitable vessels in which the active principles are recovered after evaporation.

This method of dissolving out the active principles is particularly suitable for use in connection with aromatic plants in order to recover therefrom the essential oils and in order to separate them from the terpene products by fractional distillation at low temperature.

The reason for not subjecting the material under treatment to the ordinary degree of low temperature employed in certain applications referred to above, is that such cold produces exosmotic phenomena concurrently with desiccation. The freezing of the tissues produces organic disturbances, such as the bursting of the vessels and cellular dehydration, which facilitate chemical reactions by bringing the ferments and fermentable substances into mutual contact.

The phenomenon is entirely different with the low temperatures mentioned above. In fact if an organism—for example, a plant—be plunged into a liquefied gas, the substance is attacked with violence, fixed in its natural state and, so to speak, stabilized, and immobilized in its function of active existence. The sudden and extensive difference in temperature does not allow the water time either to diffuse through the membrane or to pass through the stage of maximum volume. The tissues remain intact, and there is no atmolysis or plasmolysis. Fermentative life is suspended and the plant is brought into a condition in which it can be very easily reduced to powder without inconvenience, there being no fear of the intervention of fermentation.

The invention is especially useful in connection with the preparation of products, such as powders, extracts, juices, and active principles, of organic origin, which answer well for the purpose in view, in particular.

From an industrial standpoint, these means are more general. They are applicable, without modification, to all living organisms taken in the fresh condition; they simplify and reduce the number of operations and the size of the equipment; they dispense with costly plant, standardize and reduce the work of treatment and enable the operations to be kept under closer control.

From a pharmacological and hygienic point of view, the invention reduces the risk of change and guarantees more stringent asepsy and in turn the application of extremely low temperature enables immediate pulverization to be effected, which is a condition essentially favourable to the effective employment of the sterilizing action of the aforesaid agencies and for rapid and safe desiccation.

Moreover the invention not only makes it unnecessary to employ the injurious physical agents and to perform the mechanical operations which are liable to set up changes in the desired product but also utilizes an agent which preserves the natural integrity of the organized material, considered as a colloidal complex combination. By this invention there is obtained a stable final product having a maximum of the therapeutic and nutritive properties possessed by the organism in the fresh state, which product will keep for practically any length of time without possibility of alteration.

As is self-evident and as already mentioned, the invention is by no means restricted to the particular mode of application or embodiments that have been particularly specified but extends to all modifications of same coming within the scope of the appended claims.

What I claim and desire to protect by Letters Patent is:—

1. A method for treatment of organic matter to preserve the principal ingredients and active principles when said matter is desiccated or the active principles thereof are extracted, which consists in first congealing the organic matter, then pulverizing, then sterilizing the same, and finally drying it.

2. A method for treatment of organic matter to preserve the principal ingredients and active principles thereof when said matter is desiccated or the active principles thereof are extracted, which consists in subjecting the organic matter suddenly to a temperature considerably below the freezing point, then pulverizing, and then sterilizing the organic matter.

3. A method for treatment of organic matter to preserve the principal ingredients and active principles thereof when said matter is desiccated or the active principles thereof are extracted, which consists in subjecting the organic matter to a temperature so low that the said organic matter will become solid and may be easily pulverized without the occurrence of fermentation or other chemical action, and then pulverizing and sterilizing the organic matter while still under the influence of the low temperature.

4. A method for treatment of organic matter to preserve the principal ingredients and active principles thereof when said matter is desiccated or the active principles thereof are extracted, which consists in subjecting the organic matter to a rapid intense cooling to a state of congelation, reducing it to powder and sterilizing the powder while still in a state of congelation.

In testimony whereof I have hereunto set my hand.

HENRI LOUIS PAUL TIVAL.